United States Patent [19]

Baertlein

[11] Patent Number: 5,454,754
[45] Date of Patent: Oct. 3, 1995

[54] TOE WEB GLAND CUTTING TOOL

[76] Inventor: Lee A. Baertlein, 1571 Granville Rd., Cedarburg, Wis. 53012

[21] Appl. No.: 35,420

[22] Filed: Mar. 23, 1993

[51] Int. Cl.$^6$ .............................. A22C 17/00; A22B 3/08
[52] U.S. Cl. ............................... 452/166; 452/64; 30/228
[58] Field of Search ............................. 452/166, 63, 64, 452/149; 30/187, 228, 245

[56] References Cited

U.S. PATENT DOCUMENTS

| D. 207,485 | 4/1967 | Belknap | 452/168 |
|---|---|---|---|
| 3,488,797 | 1/1970 | Dirks | 452/149 |
| 3,893,237 | 7/1975 | Jahnke | 30/228 |
| 4,543,719 | 10/1985 | Pardoe | 30/228 |
| 5,083,971 | 1/1992 | Karubian et al. | 452/64 |
| 5,142,779 | 9/1992 | LaBounty | 30/228 |
| 5,152,713 | 10/1992 | Baertlein | 452/64 |

Primary Examiner—Willis Little
Attorney, Agent, or Firm—Foley & Lardner

[57] ABSTRACT

A toe web gland cutter blade assembly having a pair of plates mounted in a parallel spaced relation with a cutting edge on the inside edge of each plate, a cutting blade pivotally mounted between the plates, the blade including a cutting edge on each side which cooperates to cut the gland and a hook at the outer end for drawing the gland into the space between the plates, the hook including a cutting edge for cutting the gland transversely to the cutting edges.

7 Claims, 2 Drawing Sheets

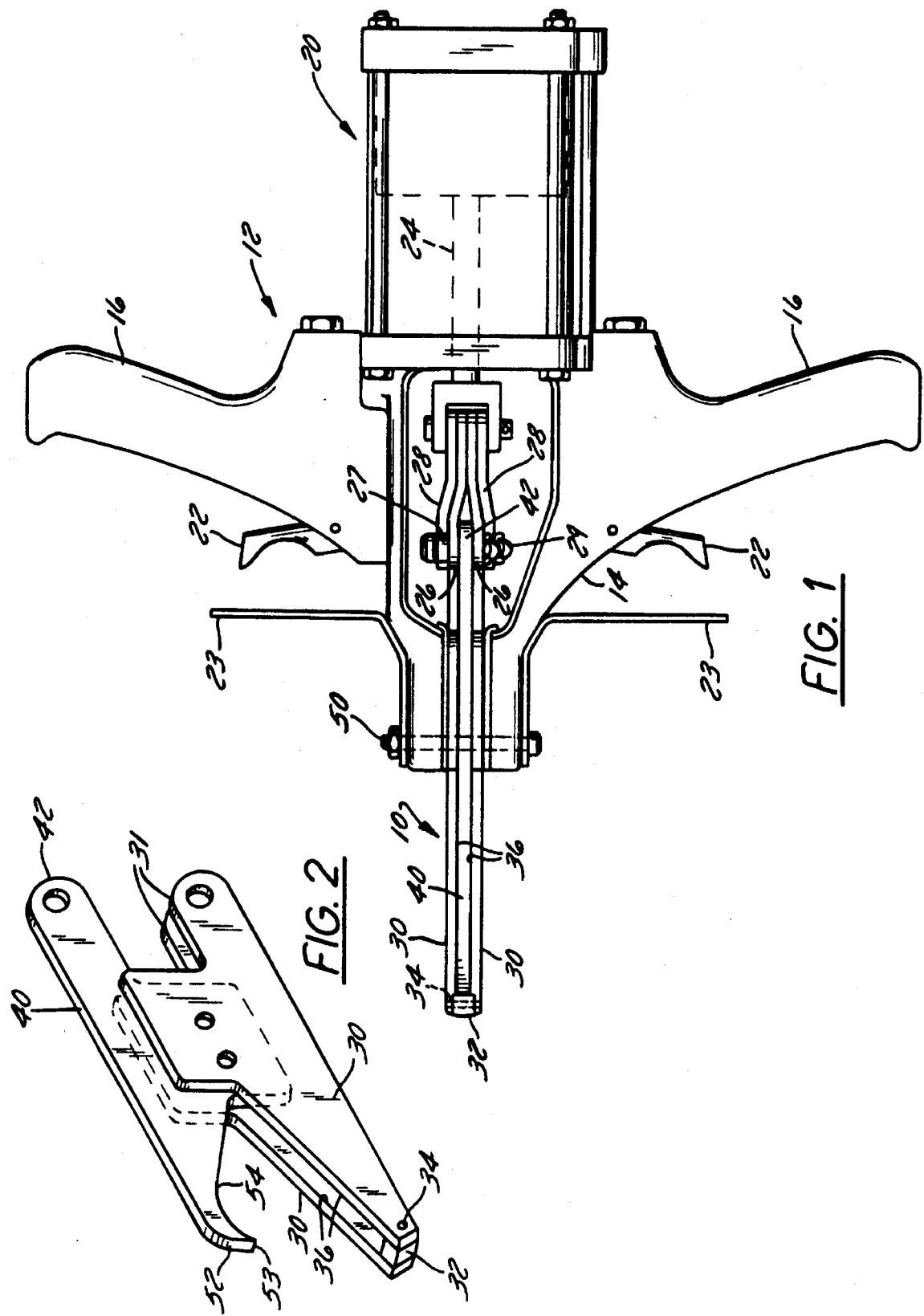

TOE WEB GLAND CUTTING TOOL

FIELD OF THE INVENTION

The present invention relates to cutter blades for cutting and trimming animals for market and more particularly to a double cutting blade assembly for removing the gland or web between the toes of the animal which is also readily adaptable to a universal power head.

BACKGROUND OF THE INVENTION

In the preparation of livestock for market a number of cutting and trimming stations are provided for selectively removing various parts of the animal. Each of the cutting steps requires a different type of utensil in order to perform the required function. Most of these tools are adaptable to a universal power head such as shown and described in U.S. Pat. No. 5,152,713, entitled "Universal Power Head For Hand Operated Tools."

A particularly troublesome trimming operation is the removal of the gland or web between the toes of swine. A certain amount of dexterity is required in order to completely remove the gland. This involves at least two cutting strokes which require additional time to complete this step in the stripping process.

SUMMARY OF THE PRESENT INVENTION

The cutter blade assembly according to the present invention includes a pair of plates which are mounted in a parallel spaced relation with a cutting edge provided on the inner edge of the walls of each of the plates. A planar blade is pivotally mounted in the space between the plates which includes a cutting edge on each side of the blade and a hook on the outer end of the blade for pulling the web or gland in the space between plates. The assembly is pivotally mounted on the universal head and simultaneously pivoted to completely remove the gland.

One of the primary advantages of the blade assembly is the ability to perform this step in the process in a single step.

A further advantage of the blade assembly is the provision of a hook on the inner blade which draws the gland into the cutting edges of the plates thus completely removing the gland in a single stroke.

Other principal features and advantages of the invention will become apparent to those skilled in the art upon review of the following drawings, the detailed description and the appended claims.

BRIEF DESCRIPTION OF THE DRAWINGS

FIG. 1 is a-side elevation view of a universal power head;

FIG. 2 is perspective view of the cutter blade assembly;

Figure 3:
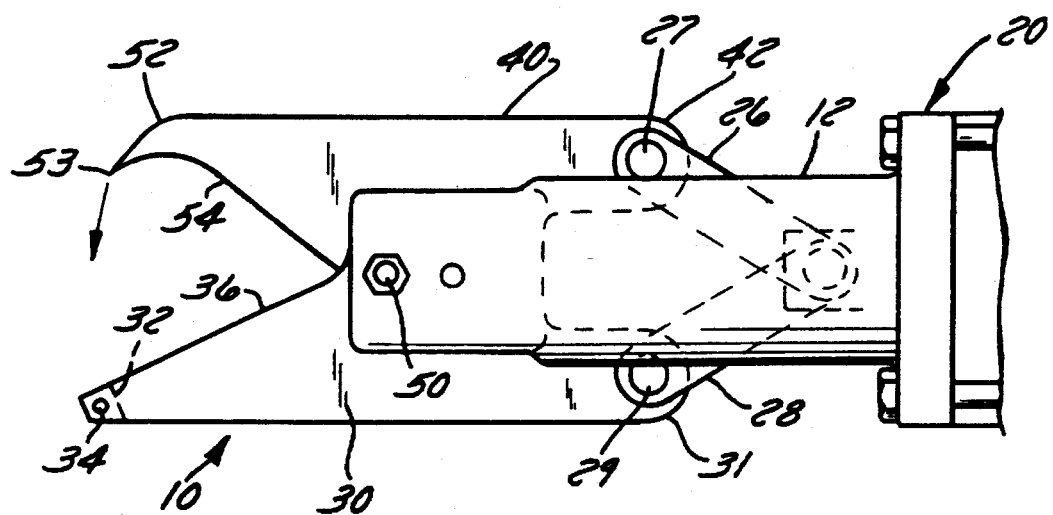
FIG. 3 is a view of the cutter assembly mounted in the universal head in the open position.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

The cutter assembly 10 according to the present invention as shown in FIGS. 1 and 2 is shown mounted on a universal power head 12. The power head generally includes a housing or body 14 having a handle 16 on one or more sides of the head. The cutter assembly 10 is shown mounted on the housing 12 and actuated by means of a pneumatic piston and cylinder assembly 20. The piston and cylinder assembly 20 is actuated by a trigger 22 provided on the handle 16. A trigger guard 23 is provided in the front of each trigger 22. As is generally understood actuation of the piston and cylinder assembly 20 is accomplished by gripping the handle 16 and squeezing the trigger 22. Actuation of the trigger 22 pressurizes one end of the piston and cylinder assembly 20 to close the blade assembly 10 on the forward stroke of the piston 24. On release of the trigger 22 the other end of the piston and cylinder assembly 20 is pressurized to open the blade assembly 10.

Figure 4:
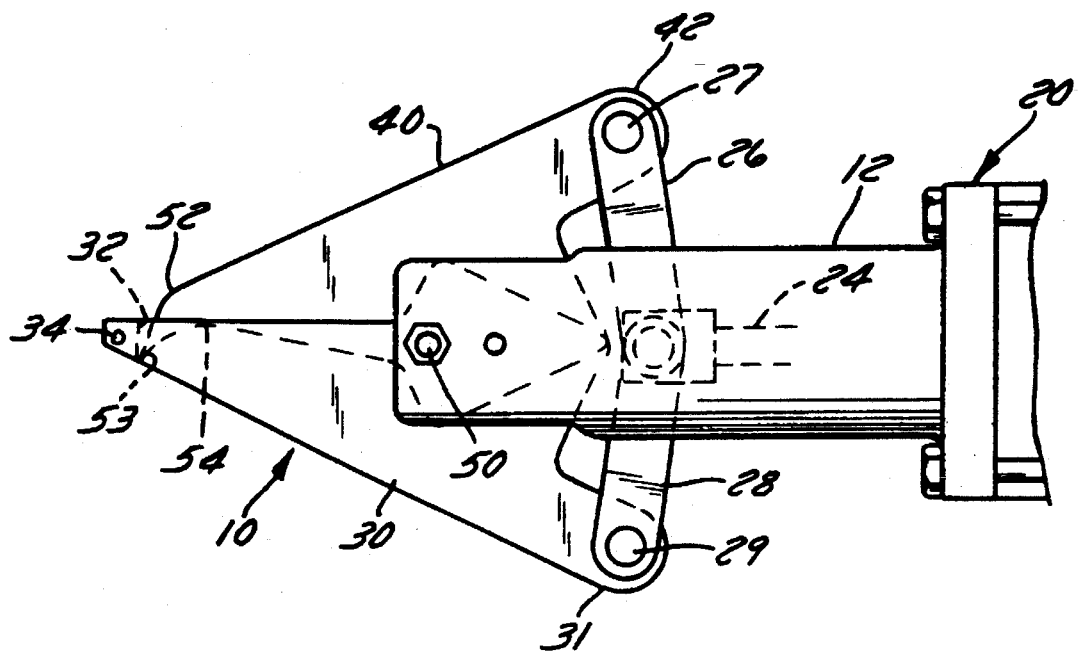
FIG. 4 is a view of the cutter assembly shown in the closed position.

More particularly, and referring to FIGS. 2, 3 and 4 the cutter assembly 10 generally includes a pair of cutter plates 30 interconnected at one end by a spacer bar 32 and held in place by a pin 34. The plates 30 are provided with a cutting edge 36, along the inside edge of one end of each of the plates 30 and a tab or extension 31 at the other end. A cutter blade 40 is pivotally mounted between the plates 30 by means of a pin 50. The cutter blade 40 includes a hook 52 at the outer end having a cutting edge 53 and a tab 42 at the other end. A cutting edge 54 is provided along each side of the cutter blade 40.

It should be noted that the cutter assembly 10 is operatively connected to the piston 24 by links 26 and 28. The link 26 is connected to the tab 42 on the inner end of blade 40 by a bolt 27. The links 28 are connected to tabs 31 on the end of plates 30 by bolts 29. Pivoting of the cutter blade 40 between the plates 30 will move the hook 52 into the space between the cutting edges of the plates 30. The hook 52 will pull the gland between the plates 30 so that the gland or web can be cut by the closing motion of the cutting edges 36 on the plates and the cutting edge 53 on the hook 52.

Thus, it should be apparent that there has been provided in accordance with the present invention a toe web gland cutting tool that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A toe web gland cutter blade assembly adaptable to a universal power head, said assembly comprising a pair of plates pivotally mounted in a parallel spaced relation on the power head, each plate including a cutting edge along the inside edge of one end of each of said plates, a cutter blade mounted on the power head for pivotal motion between said plates, a hook at the end of said cutter blade for drawing the toe web gland into the cutting edges of said plates, said hook includes a cutting edge which is transverse to the cutting edges of said plates, said cutter blade and said plates pivoting simultaneously in opposite directions whereby the cutting edge of the cutter blade cooperates with the cutting edges of said plates to cut the toe web gland.

2. The cutter blade assembly according to claim 1 wherein each of said plates and said blades includes a link operatively connecting said plates and said blade to said power head.

3. The cutter blade assembly according to claim 2 wherein said cutter blade and the plates are pivotally mounted on a common axis.

4. A toe web gland cutting tool comprising a power head, a pair of plates pivotally mounted on said power head, a spacer mounted on one end of said plates for supporting said plates in a parallel spaced relation, each plate having a cutting edge on the inside of one end of each blade, a cutter blade pivotally mounted on the power head in the space between said plates, said blade including a hook at one end for drawing the web gland between the plates; and including a cutting edge on the end of said hook which is located transverse to the cutting edges of said plates for cutting the web gland, each of said plates and said blade including a link for connecting said plates and said blade to said power head for simultaneously pivoting said blade and said plates in opposite directions whereby said blade passes through the space between said plates.

5. The cutting tool according to claim 4 wherein said plates and said blade are pivotally mounted on a common axis.

6. The cutting tool according to claim 5 wherein said blade includes a hook at one end for drawing the web gland between the blades.

7. The cutting tool according to claim 6 including a cutting edge on the end of said hook for cutting the toe web gland.

* * * * *